L. C. JOSEPHS, Jr.
LIGHT PROJECTOR.
APPLICATION FILED JUNE 6, 1919.
1,370,971.
Patented Mar. 8, 1921.
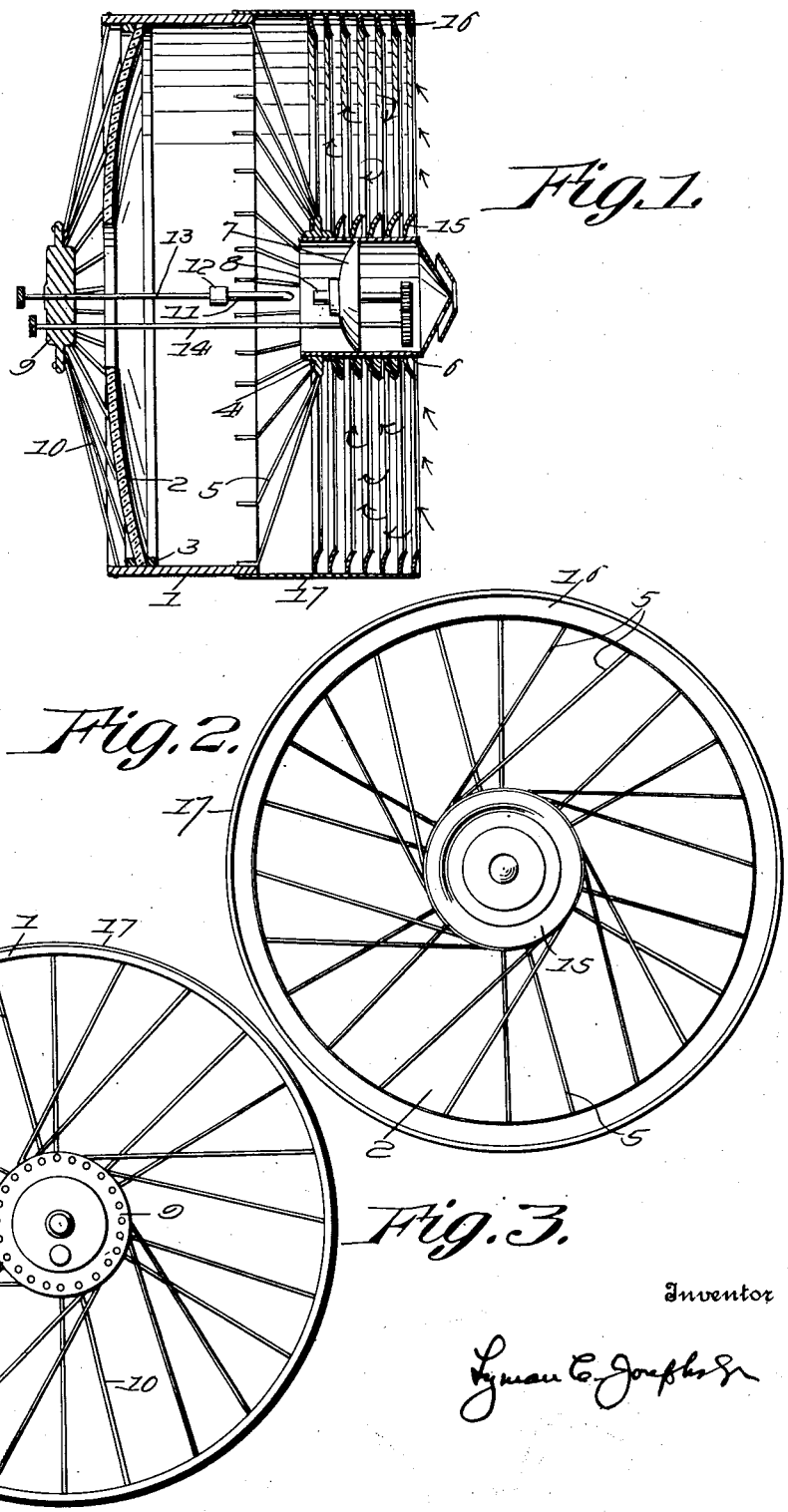

UNITED STATES PATENT OFFICE.

LYMAN C. JOSEPHS, JR., OF THE UNITED STATES ARMY, ASSIGNOR TO NEWTON D. BAKER, SECRETARY OF WAR, TRUSTEE.

LIGHT-PROJECTOR.

1,370,971.

Specification of Letters Patent.

Patented Mar. 8, 1921.

Application filed June 6, 1919. Serial No. 302,314.

(FILED UNDER THE ACT OF MARCH 3, 1883, 22 STAT. L., 625.)

*To all whom it may concern:*

Be it known that I, LYMAN C. JOSEPHS, Jr., a citizen of the United States and an officer of the United States Army, and a resident of Flushing, in the county of Queens and State of New York, have invented an Improvement in Light-Projectors, of which the following is a specification.

The invention described herein may be used by the Government, or any of its officers or employees in prosecution of work for the Government, or by any other person in the United States without payment of any royalty thereon.

My invention relates to light projectors in general and more particularly to searchlights of the type that are employed in military and naval operations.

One object of my invention is to provide a portable searchlight that is extremely simple and rugged in construction and that can be readily transported from place to place and utilized under any conditions.

A further object of my invention is to provide an open type searchlight that may be operated in high winds without the burning of the arc being disturbed.

In the co-pending application of R. W. Lewis, Serial No. 293,801, filed April 30, 1919, there is shown and described an open type portable field searchlight, which generally comprises a mirror frame, a mirror carried thereby and an arc mechanism inclosed in a casing supported in front of the mirror from the center of the mirror frame. In my co-pending application, Serial No. 301,567, filed June 13, 1919, there is shown and described an electric arc mechanism to be used in connection with an open type searchlight, in which the mechanism is supported from the center of the mirror frame.

In constructing open type searchlights, as described in the above mentioned co-pending applications, it has been found that mirror frames of considerable strength and rigidity must be provided in order to properly support lamp mechanisms from the center of the mirror frames because the bending action of heavy lamp mechanisms at the end of their relatively long supporting arms tends to cause deflection of the mirror frames. Any appreciable deflection of the mirror frames would of course result in damage to the mirrors.

By my invention, I propose to eliminate the mirror frames and to provide instead an open wheel-like construction in which the parts of the lamp mechanism are supported by the hubs and the mirror is supported by the rim of the wheel.

In operating open type searchlights as described above, it has been found that while the casings inclosing the arc mechanisms are sufficient to protect the arcs from ordinary drafts, nevertheless, when the searchlights are operated in very high winds, disturbing air currents are sent up in front of the mirror which tend to cause unsteady burning of the arc.

By my invention, I further propose to provide means by which an open type searchlight may be operated in very high winds, such as are apt to be encountered along the seacoast or even if the searchlight were to be mounted upon an airplane, without materially increasing the weight of the searchlight or sacrificing the advantages which are obtained by the use of open type searchlights.

In the accompanying drawing:

Figure 1 is a view partially in section and partially in side elevation of a searchlight embodying my invention.

Fig. 2 is a view in front elevation of the parts shown in Fig. 1.

Fig. 3 is a view in rear elevation of parts shown in Fig. 1.

Referring to the drawings, the searchlight generally comprises a circular rim 1 preferably composed of material having great rigidity and tensile strength, such as steel. A mirror 2 is suitably supported and held in position within the rim 1 by means of clamping members 3. A hub 4, here shown in the form of a ring, is centrally supported within the rim 1 by a plurality of tangential spokes 5 that flare outwardly, as in a bicycle wheel. A hollow cylindrical casing 6 is carried by the hub 4 and supports a positive head 7 and the positive carbon 8 of an electric arc mechanism.

A second hub 9, here shown in the form of a plate of substantially the same diameter as the hub 4, is centrally supported with respect to the rim 1 by a plurality of tangential spokes 10 that flare outwardly, as in a bicycle wheel. A negative carbon 11 is supported with one end adjacent to the end of the positive carbon 8 by a carbon holder 12 that is carried at the end of a controlling rod 13 extending through the hub 9. The rotation and the feeding of the positive carbon 8 is adapted to be controlled by a rod 14 that also extends through the hub 9. The details of the mechanism for controlling the carbons 8 and 11 form no part of the present invention, but are fully described in my above mentioned co-pending patent application.

From the foregoing, it is apparent that the weight of the lamp mechanism is evenly distributed around the rim 1, so that there is no tendency for any deflection thereof which might damage the mirror 2.

The casing 6 is encircled by an inner annular series of transversely arcuate vanes or deflectors, 15, designed to coöperate with a similarly shaped outer series of vanes, or deflectors, 16, circumscribing the inner surface of a casing, 17, which telescopically engages casing, 1. By this arrangement air currents striking the vanes will be deflected to produce cross currents in the annular area between the respective series of deflectors and these cross currents will prevent the admission of disturbing air currents to the space between the reflector and arc mechanism, in fact, as the force of the external air currents increase the cross currents of air set up by the vanes will likewise increase, to produce a substantially dead air space directly in front of the reflector.

While the curved deflecting surfaces in the present embodiment consists of a plurality of separate vanes 15 and 16, shown in cross section, it is obvious that the same result may be obtained by the use of continuous spiral vanes, and while I have shown the vanes as applied to a particular form of searchlight, it is obvious that the same arrangement may be used in connection with any type of searchlight in which the arc is more or less open to external air currents. My proposed form of rim and hub construction may also be used in connection with other types of electric arc mechanisms without departing from the spirit and scope of my invention. I therefore desire that only such limitation be placed thereon as may come within the scope of the appended claims.

I claim as my invention:

1. A light projector embodying a wheel structure comprising a rim, spokes and hubs, a reflector supported by said rim and a source of light supported by said hubs.

2. A light projector embodying a wheel structure comprising a rim, spokes and hubs, a reflector supported by said rim between said hubs and a lamp mechanism supported by said hubs and extending through said mirror.

3. A light projector comprising an annular member and hubs centrally supported from said annular member by tangential spokes, a reflector supported by said annular member between said hubs and a lamp mechanism carried by said hubs.

4. In a light projector, the combination with a reflector and an electric arc mechanism supported in front of said reflector, of concentrically arranged deflectors surrounding the arc mechanism for obstructing the entrance of air currents into the space in front of said reflector.

5. In a light projector, the combination with a reflector and an electric arc mechanism supported in front of said reflector, of concentrically arranged, radially spaced deflectors surrounding the arc mechanism for obstructing the entrance of air currents into the space in front of said reflector.

6. In a light projector, the combination with a reflector and an electric arc mechanism supported in front of said reflector, of concentrically arranged deflector sets surrounding the arc mechanism for obstructing the entrance of air currents into the space in front of said reflector.

7. In a light projector, the combination with a reflector and an electric arc mechanism supported in front of said reflector, of concentrically arranged, radially spaced deflector sets, surrounding the arc mechanism for obstructing the entrance of air currents into the space in front of said reflector.

8. In a light projector, the combination with a reflector and an electric arc mechanism including its housing supported in advance of the reflector, of concentrically arranged deflectors surrounding the arc housing for obstructing air currents and creating a dead air space in the immediate vicinity of the reflector.

9. In a light projector, the combination with a reflector and an electric arc mechanism including its housing supported in advance of the reflector, of concentrically arranged, radially spaced deflectors surrounding the arc housing for obstructing air currents and creating a dead air space in the immediate vicinity of the reflector.

10. In a light projector, the combination with a reflector, and an electric arc mechanism including its housing supported in advance of the reflector, of concentrically arranged deflector sets surrounding the arc housing for obstructing air currents and creating a dead air space in the immediate vicinity of the reflector.

11. In a light projector, the combination with a reflector, and an electric arc mechanism including its housing supported in advance of the reflector, of concentrically arranged, radially spaced reflector sets surrounding the arc housing for obstructing air currents and creating a dead air space in the immediate vicinity of the reflector.

12. In a light projector, the combination with a reflector and an electric arc mechanism including its housing supported in advance of the reflector, of an inner and outer concentrically arranged series of deflecting vanes encircling the arc housing for obstructing air currents and creating a dead air space in the immediate vicinity of the reflector.

13. In a light projector, the combination with a reflector and an electric arc mechanism including its housing supported in advance of the reflector, of an inner and outer series of concentrically arranged, radially spaced deflector vanes encircling the arc housing for obstructing air currents and creating a dead air space in the immediate vicinity of the reflector.

14. In a light projector, the combination with a reflector and an electric arc mechanism including its housing supported in advance of the reflector, of inner and outer concentrically arranged, radially spaced deflector sets, encircling the arc housing, each set involving a series of transversely arcuate vanes for deflecting air currents and creating a dead air space in the vicinity of the reflector.

LYMAN C. JOSEPHS, Jr.